United States Patent
Pedersen et al.

(10) Patent No.: US 9,663,162 B1
(45) Date of Patent: May 30, 2017

(54) HYDRAULIC PIVOT ARM POSITIONING ASSEMBLY

(71) Applicant: GOMACO Corporation, Ida Grove, IA (US)

(72) Inventors: Scott Pedersen, Rockwell City, IA (US); Kyle Leners, Lake View, IA (US); Steven Schnabel, Ida Grove, IA (US); Lex Jacobson, Battle Creek, IA (US); Adam Larsen, Ida Grove, IA (US); Stuart Bohm, Lake View, IA (US); Kevin L. Klein, Denison, IA (US)

(73) Assignee: GOMACO Corporation, Ida Grove, IA (US)

( * ) Notice: Subject to any disclaimer, the term of this patent is extended or adjusted under 35 U.S.C. 154(b) by 128 days.

(21) Appl. No.: 14/635,697

(22) Filed: Mar. 2, 2015

Related U.S. Application Data (60) Provisional application No. 61/946,102, filed on Feb. 28, 2014.

(51) Int. Cl.
*E01C 19/00* (2006.01)
*E01C 19/42* (2006.01)
*B62D 55/084* (2006.01)

(52) U.S. Cl.
CPC .......... *B62D 55/084* (2013.01); *E01C 19/00* (2013.01); *E01C 19/42* (2013.01); *E01C 2301/00* (2013.01)

(58) Field of Classification Search
CPC ...... E01C 19/00; E01C 19/42; E01C 2301/00; E01C 19/22; E01C 19/48; B62D 11/20; B62D 55/06; B62D 55/084
See application file for complete search history.

(56) References Cited

U.S. PATENT DOCUMENTS

| | | | | |
|---|---|---|---|---|
| 4,900,186 A | * | 2/1990 | Swisher, Jr. | E01C 19/48 404/104 |
| 5,590,977 A | * | 1/1997 | Guntert | B62D 55/065 404/101 |
| 6,481,923 B1 | * | 11/2002 | Casters | E01C 19/40 404/104 |
| 6,481,924 B1 | * | 11/2002 | Smolders | B62D 7/02 180/408 |
| 6,872,028 B2 | * | 3/2005 | Aeschlimann | E01C 19/40 404/101 |
| 8,459,898 B2 | * | 6/2013 | Guntert, Jr. | E01C 19/42 180/411 |

(Continued)

*Primary Examiner* — Abigail A Risic
(74) *Attorney, Agent, or Firm* — Suiter Swantz pc llo (57) ABSTRACT

A hydraulic pivot arm positioning assembly includes a forward and aft pivoting arm on both the left and right ends of a paving machine configured to operate in a paving direction. Hydraulic cylinders or other linear actuators enable the forward and aft pivoting arms to rotate automatically through at least a 90-degree range including at least an operating configuration, wherein the pivoting arms extend parallel to the paving direction, and a transport configuration, wherein the pivoting arms extend parallel to the transverse framework of the paving machine, narrowing its overall width. The use of linear actuators enables the pivoting arms to change position with minimal downtime to the paving machine, and without the need for manual repositioning, disconnection, or reconnection of components or accessories of the pivot arm positioning assembly.

15 Claims, 11 Drawing Sheets

(56) References Cited

U.S. PATENT DOCUMENTS

| | | | | |
|---|---|---|---|---|
| 2003/0072613 A1* | 4/2003 | Colvard | ............... | B62D 7/026 404/105 |
| 2010/0021234 A1* | 1/2010 | Willis | ............... | B62D 7/026 404/90 |
| 2011/0236129 A1* | 9/2011 | Guntert, Jr. | ............ | E01C 19/42 404/72 |
| 2013/0000996 A1* | 1/2013 | Miller | ............... | B62D 7/02 180/9.46 |
| 2014/0333115 A1* | 11/2014 | Berning | ............... | B62D 3/02 299/10 |
| 2015/0083517 A1* | 3/2015 | Farr | ............... | B62D 7/02 180/414 |
| 2015/0354148 A1* | 12/2015 | Dahm | ............... | E01C 19/004 404/84.05 |
| 2015/0354150 A1* | 12/2015 | Dahm | ............... | E01C 19/4886 404/84.05 |
| 2016/0137242 A1* | 5/2016 | Dahm | ............... | G05D 1/0891 180/8.6 |
| 2016/0177517 A1* | 6/2016 | Engels | ............... | G06T 7/20 404/75 |

\* cited by examiner

HYDRAULIC PIVOT ARM POSITIONING ASSEMBLY

CROSS-REFERENCE TO RELATED APPLICATIONS

The present application claims the benefit under 35 U.S.C. §119(e) of U.S. Provisional Patent Application Ser. No. 61/946,102 filed Feb. 28, 2014, which application is herein incorporated by reference in its entirety.

TECHNICAL FIELD

Embodiments of the present invention are directed generally to the field of paving operations, and more particularly to actuation mechanisms enabling the automatic rotation of one or more pivoting arms of an end frame suitable for use in a paving train.

BACKGROUND

A paving machine configured to operate in a paving direction (e.g., the centerline of the roadway or surface to be paved being parallel to the longitudinal axis of the paving machine) may incorporate a paving kit, dowel bar inserter, texturing device, or other attachment or accessory secured to a lateral (ex.—transverse) framework. The lateral framework of the paving machine may comprise individual frame members of tubular steel, generally perpendicular to the paving direction. The lateral framework may support a diesel engine, electrical generator or other similar power plant for propulsion and to supply power to components of the paving machine or additional accessories removably mounted to the lateral framework.

The lateral framework may additionally support a module for the machine operator, including a user interface for the machine's control system. An end car may support the lateral framework at its left and right ends. Each end car may in turn incorporate a leg (ex.—vertical support) at its front and aft ends. Each leg may then be coupled to a steerable crawler, so that the steerable crawlers as a group contact the ground and propel the paving machine in the paving direction (i.e., longitudinally). Steerable crawlers may contact the ground via a continuous crawler track. A steerable crawler may be configured to rotate around its attached leg (via manual, hydraulic, or electronic over hydraulic actuation) alone or in combination with other attached steerable crawlers. The paving machine may therefore operate in a variety of steering modes. For example, a four-track machine (including a forward and aft crawler on both left and right end cars) may operate in a front or rear steering mode whereby the two forward or two aft steerable crawlers rotate in unison. A coordinated steering mode may position each opposing pair of steerable crawlers (i.e., left forward/right aft, right forward/left aft) in parallel alignment so that the paving machine may rotate 360 degrees within its own dimensions. A crab steering mode may direct all four steerable crawlers to turn in unison, so that the paving machine may be easily oriented on line or positioned on another vehicle for transport. When in an operating configuration, all steerable crawlers (whether two-track or four-track) will be oriented longitudinally so as to propel the paving machine in the paving direction. When transporting the machine from one site to another (i.e., via flatbed truck or similar vehicle), a narrower machine configuration is preferred. Therefore, the paving machine may be converted to a transport configuration whereby the steerable crawlers are rotated to an orientation parallel to the lateral framework (and consequently perpendicular to the paving direction).

To allow for the narrowest possible machine configuration, a supporting leg may be pivotably connected to its respective end car. For example, when in an operating configuration, the forward and aft legs of an end car may be fully extended in front of or behind, and perpendicular to, the lateral framework of the paving machine via an arm structure or similar extension. Each leg of the paving machine may include a vertically adjustable column capable of raising or lowering the height of the machine (e.g., via hydraulic jacking). If the lateral framework is otherwise supported, the vertically adjustable legs may be used to raise the attached steerable crawlers above ground level. Consequently, if forward and aft legs are connected to an end frame by a pivotable arm structure, the paving machine may be converted to a narrower transport configuration by, for example: rotating the steerable crawlers to align with the lateral framework; raising the steerable crawlers off the ground while supporting the lateral framework; and pivoting the arm structures to minimize the overall width of the paving machine. However, generally the arm structures must be pivoted manually, and any turnbuckles or supports holding the arm structures in place must be disconnected and then reconnected into a new position, a time-consuming process resulting in additional downtime for the paving machine. Even if the arm structures are partially articulable by hydraulic cylinders or similar actuators, the actuators must still be manually disconnected in order to pivot the arm structures beyond the plane defined by the end frame. It may therefore be desirable to provide fully automatic rotation of pivoting arms, and the connected adjustable legs, from an operating configuration to a transport configuration, without the need for manual repositioning, disconnection, or reconnection of components.

SUMMARY

Embodiments of the present disclosure are directed to a pivot arm assembly that provides for automatic reconfiguration of a paving machine without manual repositioning or removal of components. In one embodiment, the assembly includes an end frame fixed to the end of the lateral framework of the paving machine. For example, the end frame may have a forward and an aft end, relative to the paving direction in which the paving machine operates. In one embodiment, a forward pivot arm and an aft pivot arm are connected to the end frame (at the forward and aft ends respectively) by forward and aft pivot pins. For example, the forward pivot arm may be rotatably coupled to the forward end of an end frame. In one embodiment, the pivot arm may be further connected to an adjustable leg of the paving machine. For example, a forward pivot arm may be coupled to an adjustable leg of the paving machine opposite the forward pivot pin. In one embodiment, forward and aft hydraulic cylinders (or other similar linear actuators) articulate the forward and aft pivot arms through a continuous arc around their respective pivot pins. For example, the hydraulic cylinder may enable the automatic positioning of a pivot arm within an arc of at least 90 degrees, the arc including an operational configuration (wherein the pivot arm is extended parallel to the paving direction) and a transport configuration (wherein the pivot arm is extended parallel to the lateral framework, reducing the overall width of the paving machine).

Embodiments of the present invention are further directed to a paving machine incorporating a pivot arm positioning assembly at either end of its lateral framework. For example, a four-track paving machine may incorporate a left end frame and a right end frame, each end frame coupled to a forward and an aft adjustable leg, such that the paving machine includes four steerable crawlers. In one embodiment, each end frame has a forward end and an aft end relative to the paving direction. In one embodiment, a forward pivot arm and an aft pivot arm are connected to each end frame (at the forward and aft ends respectively) by forward and aft pivot pins. In one embodiment, each forward or aft pivot arm may be further connected to a forward or aft adjustable leg of the paving machine. In one embodiment, forward and aft hydraulic cylinders (or other similar linear actuators) articulate the forward and aft pivot arms through a continuous arc around their respective pivot pins. For example, the hydraulic cylinder may enable the automatic positioning of a pivot arm within an arc of at least 90 degrees, the range of the arc including at least an operational configuration (wherein the pivot arm is extended parallel to the paving direction) and a transport configuration (wherein the pivot arm is extended parallel to the lateral framework, reducing the overall width of the paving machine).

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The invention may be better understood by those skilled in the art by reference to the accompanying figures in which.

DETAILED DESCRIPTION

Features of the invention in its various embodiments are exemplified by the following descriptions with reference to the accompanying drawings, which describe the invention with further detail. These drawings depict only selected embodiments of the invention, and should not be considered to limit its scope in any way.

Figure 1A:
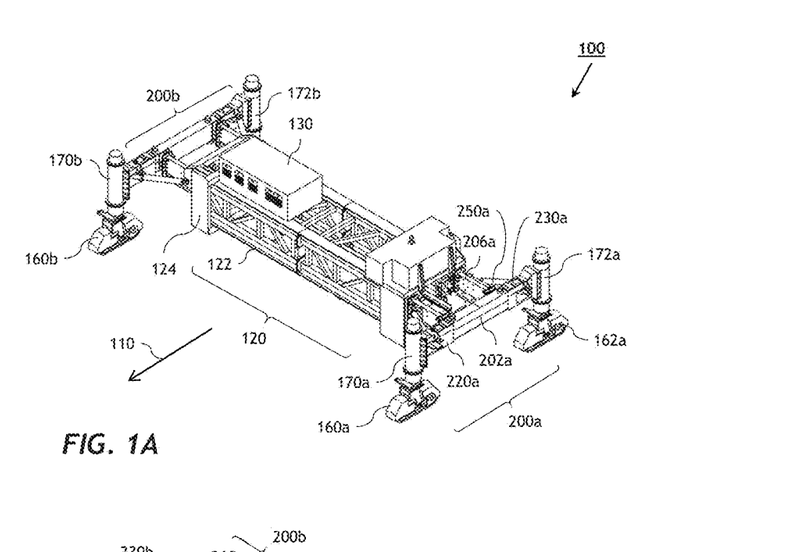
FIGS. 1A and 1B are front perspective views of a paving machine incorporating a pivot arm assembly according to an embodiment of the present invention.
Figure 1B:
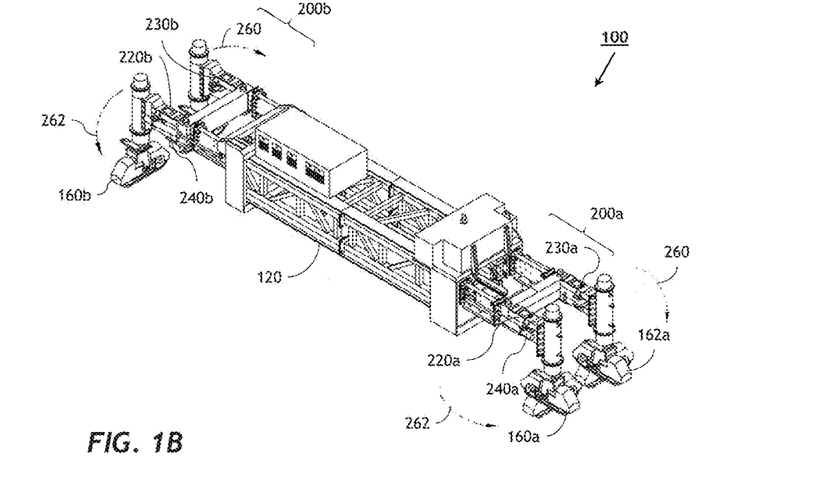

In one embodiment, referring to FIGS. 1A and 1B, a paving machine 100 incorporates pivot arm positioning assemblies 200a, 200b fixed to either end of the lateral framework 120 of the paving machine 100. For example, pivot arm positioning assembly 200b may be fixed (ex.— bolted) to an end car 124 which is itself connected to the lateral framework 120, or fixed directly to the lateral framework 120. In one embodiment, lateral framework 120 of paving machine 100 incorporates several individual frame members 122. For example, frame members 122 may be added or removed to extend or retract the transverse width of lateral framework 120 (and thus of the paving machine 100). Frame members 122 may incorporate a telescoping structure, allowing paving machine 100 to precisely adjust its width without the addition or subtraction of individual frame members 122. In one embodiment, a power plant 130 is mounted to lateral framework 120. For example, a gasoline engine, diesel engine, electric generator, or similar power source may provide propulsion for paving machine 100 as well as power for components and accessories of the paving machine 100 (including linear actuators 240, 250). In one embodiment, the paving machine 100 is a slipform paving machine incorporating a mold or spreader plow fixed to the forward surface of lateral framework 120 for the distribution of concrete or other paving materials into a paved slab of predetermined depth and width. In one embodiment, the paving machine 100 may be a texturing machine, a pavement spreading machine, a curing machine, or a placer machine. For example, the paving machine 100 may be a modular paving machine incorporating attachable and detachable texturing accessories, spreading accessories, placing accessories or curing accessories (e.g., one or more power transition adjusters (PTAs) for controlling the crown height of a paved slab). In one embodiment, the paving machine 100 includes a burlap drag, dowel bar inserter (DBI), or similar finishing accessory fixed to the rear surface of lateral framework 120. In one embodiment, the lateral framework 120 of the paving machine 100 includes a module for the machine operator and a user interface or similar means for the operator to supply user input to the control system of the paving machine 100.

Referring specifically to FIG. 1A, in one embodiment the paving machine 100 may operate in a paving direction 110 while in an operating configuration. For example, forward adjustable legs and aft adjustable legs of the paving machine 100 may be connected to pivot arm positioning assemblies 200a and 200b respectively at the leg barrels 170, 172 of each adjustable leg. In one embodiment, a forward steerable crawler 160 or aft steerable crawler 162 is mounted at the end of each adjustable leg, the steerable crawler 160, 162 serving as a point of contact between the paving machine 100 and the ground. In one embodiment, when paving machine 100 is in an operating configuration, forward steerable crawlers 160 and aft steerable crawlers 162 may be aligned parallel to paving direction 110, and parallel to the end frames 202 of pivot arm positioning assemblies 200a, 200b. For example, the operator of paving machine 100 may adjust the precise alignment of one or more steerable crawlers 160, 162 depending on the desired steering configuration, or the control system of paving machine 100 may make automatic steering adjustments. However, the general alignment of steerable crawlers 160, 162 when the paving machine 100 is in an operating configuration will be as shown by FIG. 1A. In one embodiment, when paving machine 100 is in an operating configuration, forward pivot arms 220 and aft pivot arms 230 of pivot arm positioning assemblies 200a, 200b will be fully extended parallel to end frames 202 (and parallel to paving direction 110).

Figure 2A:
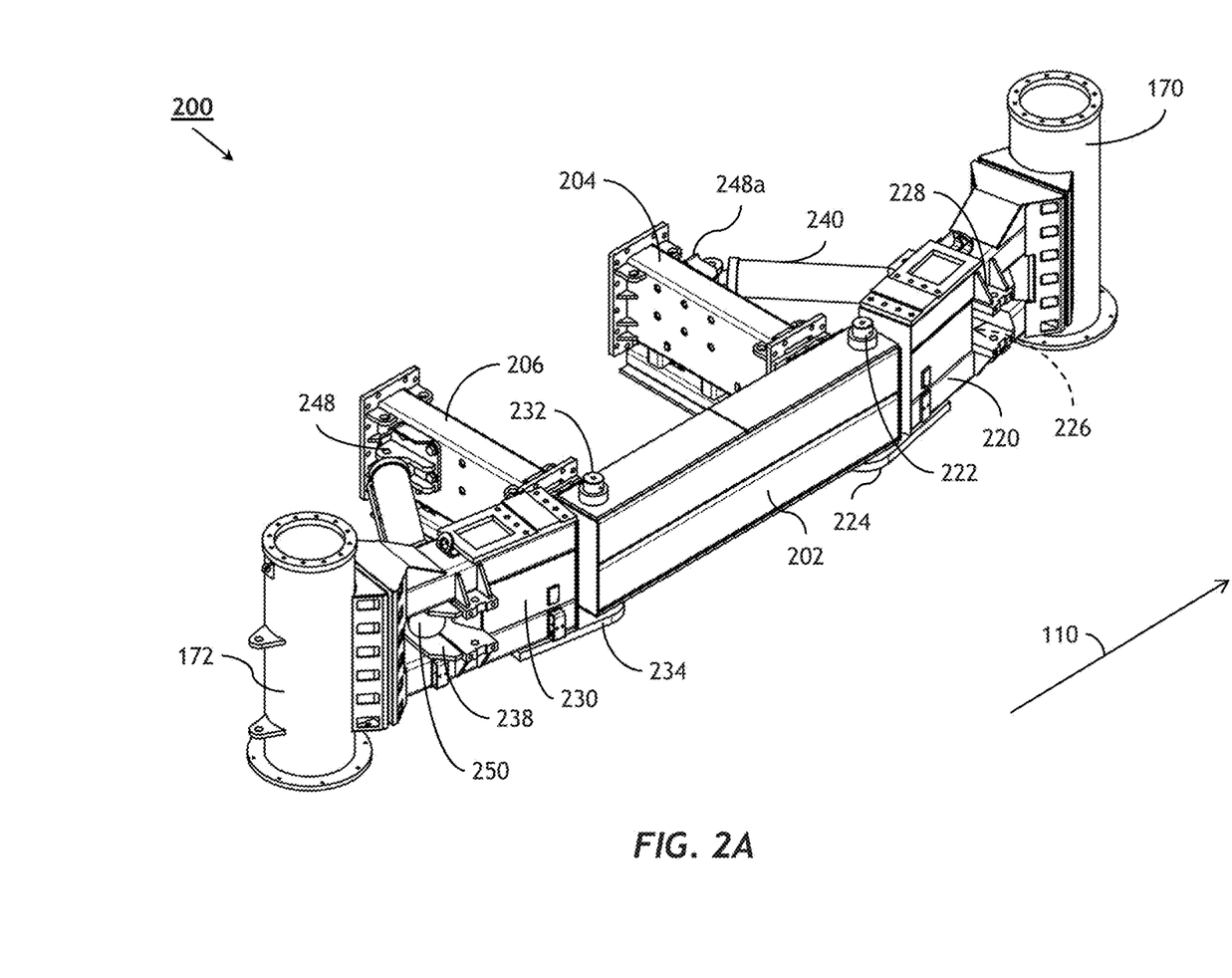
FIG. 2A is a front perspective view of a pivot arm assembly in a retracted configuration according to an embodiment of the present invention.
Figure 2B:
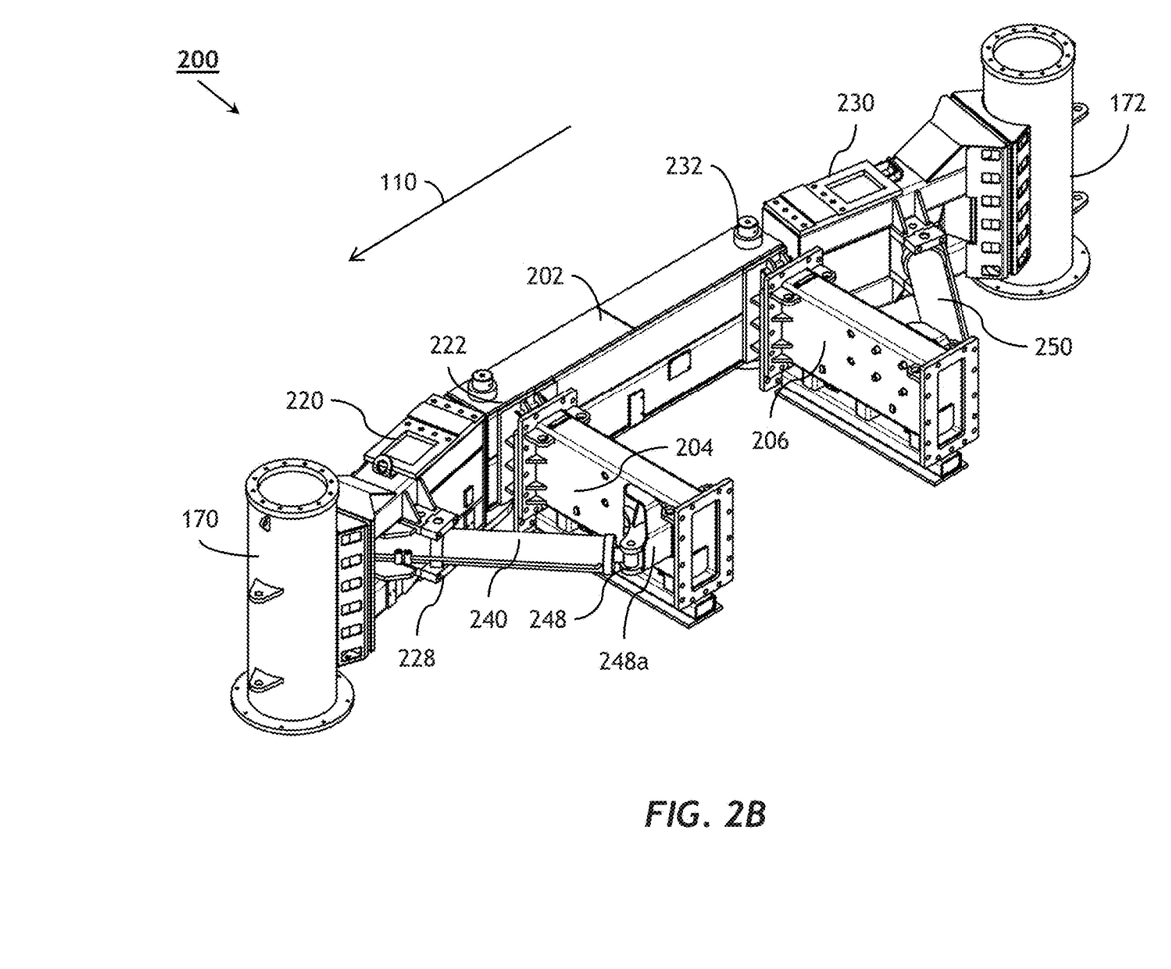
FIG. 2B is a rear perspective view of a pivot arm assembly in a retracted configuration according to an embodiment of the present invention.

Referring to FIG. 1B, when transporting paving machine 100 from one site to another, it may be desirable to minimize the width of paving machine 100 to facilitate transport on a flatbed truck or similar vehicle. In one embodiment, pivot arm positioning assemblies 200a, 200b facilitate transport of paving machine 100 with minimal downtime by automatically converting paving machine 100 from an operating configuration (as shown by FIG. 1A) to a narrower (ex.—transport) configuration without the need for manual disconnection, reconnection, or repositioning of any components of pivot arm positioning assembly 200. For example, forward pivot arms 220a, 220b may rotate (262) to a second position and aft pivot arms 230a, 230b may rotate (260) to a second position (as shown by FIG. 1B) whereby all pivot arms 220, 230 extend parallel to lateral framework 120 and perpendicular to paving direction 110. In one embodiment, although the adjustable legs 170, 172 and steerable crawlers 160, 162 connected to pivot arms 220, 230 are in positions consistent with a transport configuration after the rotation of pivot arms 220, 230, steerable crawler 160b remains in an operational orientation (i.e., parallel to paving direction 110) and does not rotate into transport orientation until its respective adjustable leg 170b and pivot arm 220b have reached their new position (as shown by FIG. 2B). In one embodiment, steerable crawlers 160a, 162a counter-rotate simultaneously with their respective pivot arms 220a, 230a, such that steerable crawler 160a remains substantially parallel to pivot arm 220a (and steerable crawler remains substantially parallel to pivot arm 230a) as pivot arms 220a, 230a rotate into a transport configuration (as shown by FIG. 2B). For example, steerable crawlers 160, 162 may be manually rotated by the operator of paving machine 100, or the control system of paving machine 100 may automatically coordinate the rotation of pivot arms 220, 230 and steerable crawlers 160, 162.

Figure 2C:
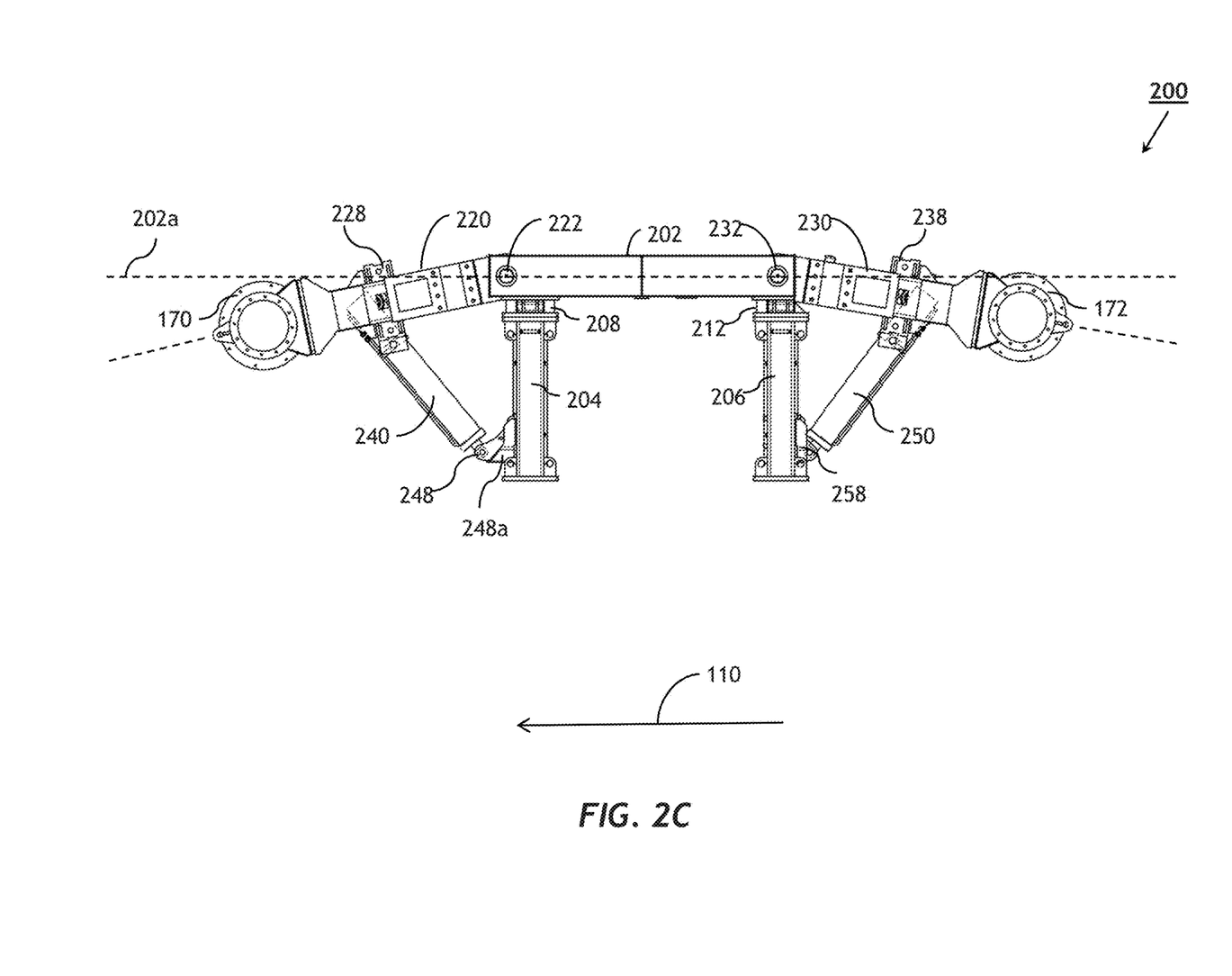
FIG. 2C is an overhead view of a pivot arm assembly in a retracted configuration according to an embodiment of the present invention.
Figure 2D:
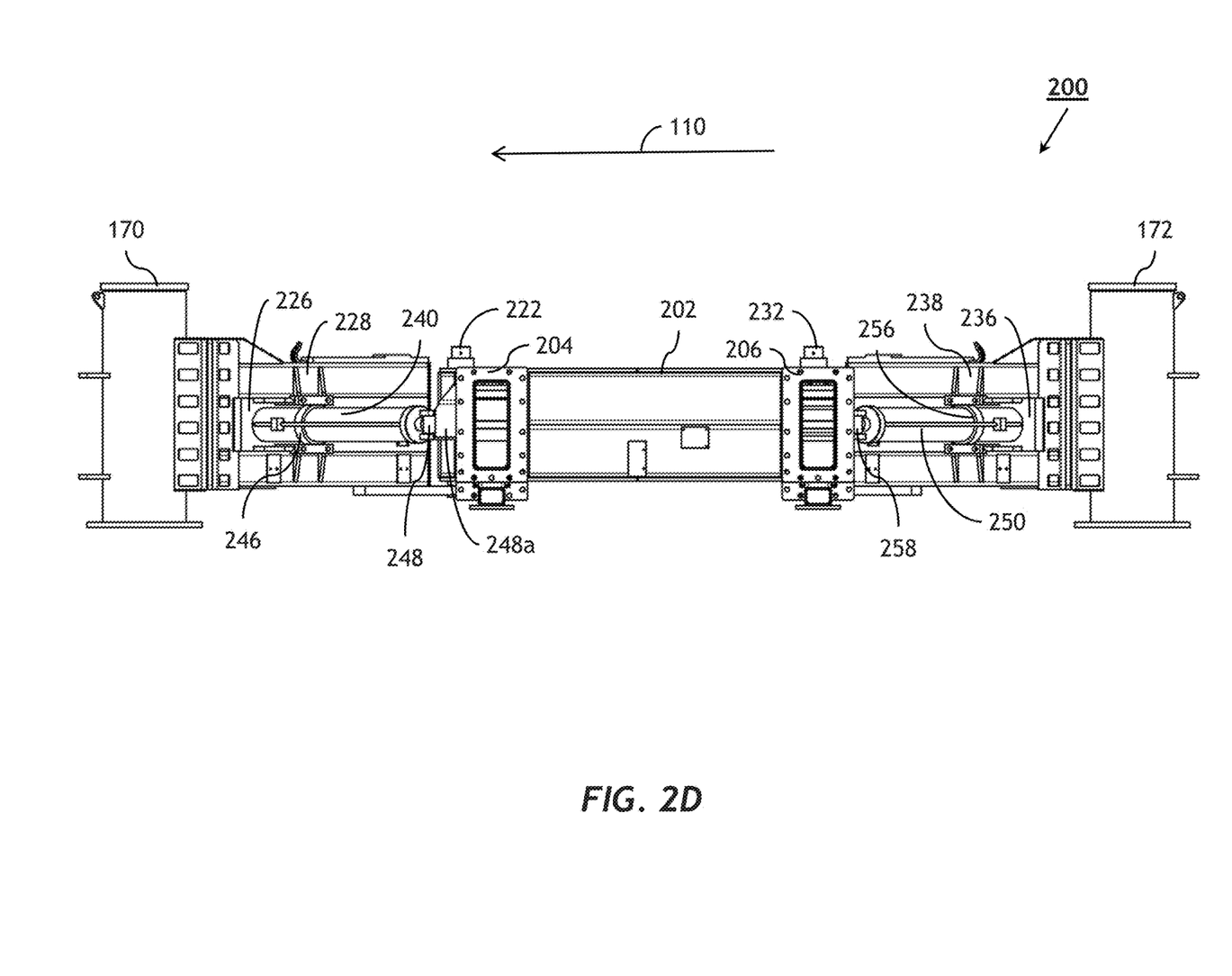
FIG. 2D is a side view of a pivot arm assembly in a retracted configuration according to an embodiment of the present invention.

FIGS. 2A-2D illustrate a hydraulic pivot arm positioning assembly 200 in a fully retracted configuration according to embodiments of the present disclosure. In one embodiment, a paving machine 100 configured to operate in a paving direction 110 incorporates a hydraulic pivot arm positioning assembly 200 fixed to each end (i.e., the left end and the right end) of the lateral framework 120 of the paving machine 100. For example, an end frame 202 may be bolted or otherwise securely fixed to frame members 204 and 206 via flanges 208 and 212 (most clearly shown by FIG. 2C). The lateral framework 120 of the paving machine 100 may extend transversely across the surface to be paved or textured, perpendicular to paving direction 110. As best shown by FIG. 2C, the outer surfaces of frame members 204, 206 may define a forward surface and an aft surface relative to the paving direction 110 (and parallel to the forward and aft surfaces of lateral framework 120). In one embodiment, the end frame 202, frame members 204 and 206, and pivot arms 220 and 230 are fashioned from tubular steel. In one embodiment, power cabling from power plant 130 to the pivot arm positioning assembly 200 is provided externally to the lateral framework 120 or via internal trays (not shown) positioned within the lateral framework 120.

Figure 3A:
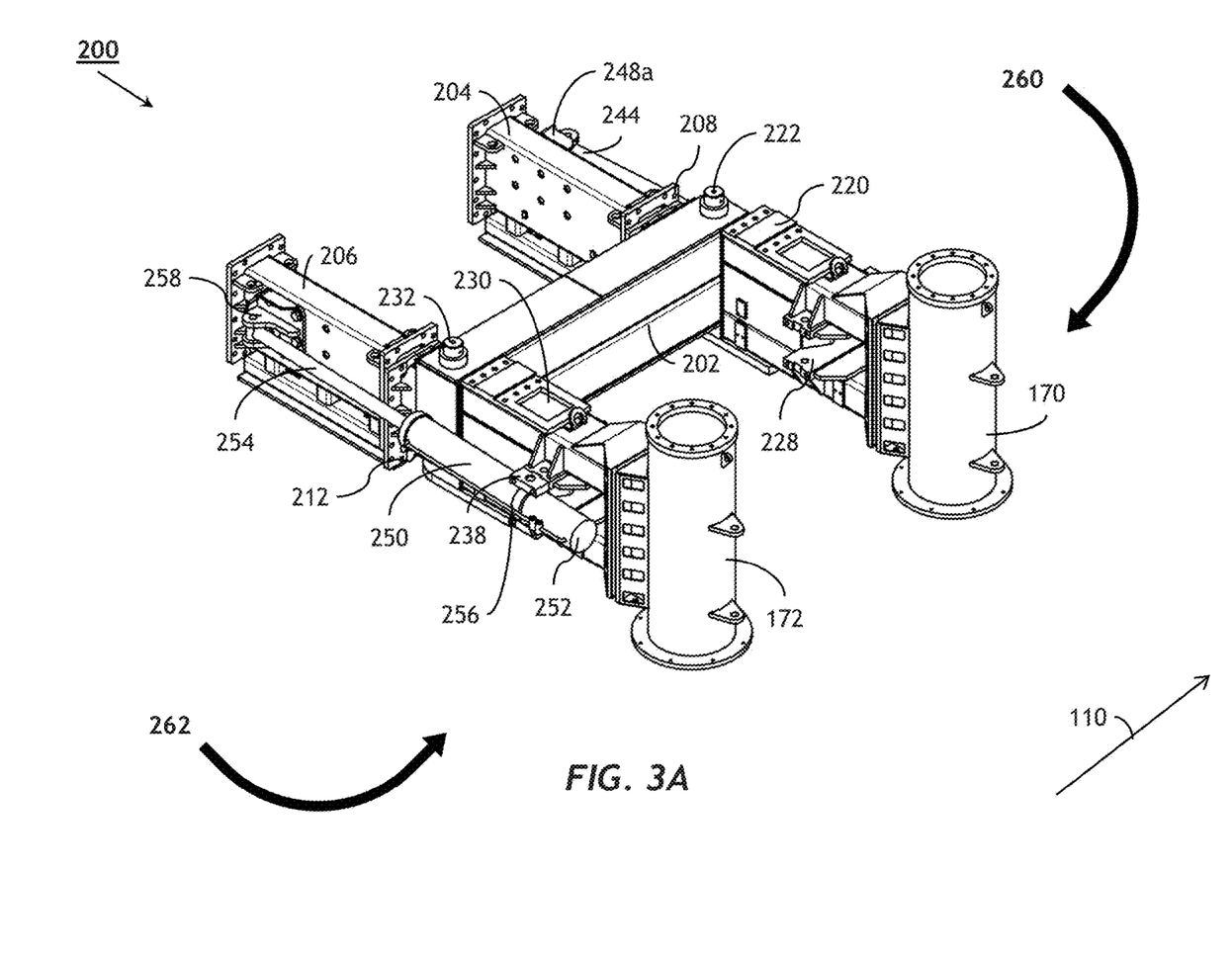
FIG. 3A is a front perspective view of a pivot arm assembly in an extended configuration according to an embodiment of the present invention.
Figure 3B:
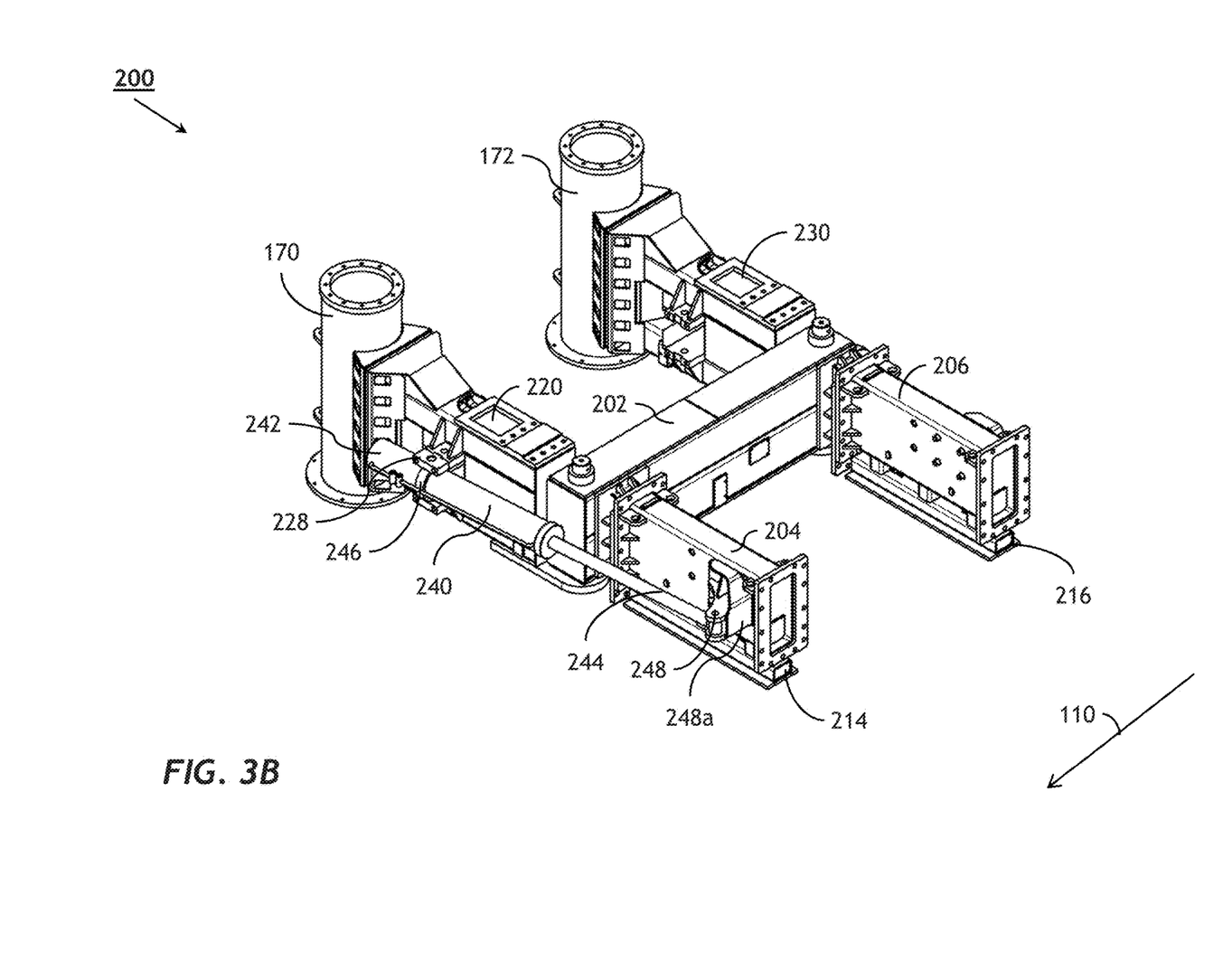
FIG. 3B is a rear perspective view of a pivot arm assembly in an extended configuration according to an embodiment of the present invention.

In one embodiment, forward and aft pivot pins 222, 232 of pivot arm positioning assembly 200 are mounted to the forward and aft ends respectively of end frame 202. In one embodiment, yokes 224, 234 on the undersides of pivot arms 220, 230 (most clearly shown by FIG. 2A) are rotatably mounted to pivot pins 222, 232, allowing forward and aft pivot arms 220, 230 to pivot around axes of rotation defined by the pivot pins 222, 232. In one embodiment, forward and aft linear actuators 240 and 250 articulate the forward and aft pivot arms 220 and 230 through a continuous arc around their respective pivot pins 222 and 232. For example, the range of motion (ex.—continuous arc) of pivot arms 220 and 230 may be bounded by a first position as shown by FIGS. 2A-2D and a second position as shown by FIGS. 3A-3B. In one embodiment, the continuous range of motion of pivot arms 220, 230 includes at least a position corresponding to an operating configuration of paving machine 100 and a position corresponding to a transport configuration of paving machine 100. In one embodiment, pivot arms 220, 230 may each incorporate more than one linear actuator 240, 250.

In one embodiment, a paving machine 100 incorporates two sets of pivot arms 220 and 230 (i.e., a forward pivot arm 220 and an aft pivot arm 230 mounted to each of a left and a right end frame 202) fully extended parallel to paving direction 110 and perpendicular to the lateral framework of the paving machine 100 (frame members 204, 206). For example, pivot arms 220 and 230 may be connected to the adjustable legs 170, 172 of the paving machine 100 opposite the pivot pins 222, 232. In one embodiment, referring to FIG. 2C, the range of motion of pivot arms 220 and 230 extend within the plane 202a defined by end frame 202 and toward the forward and aft surfaces of lateral framework 120 (relative to the paving machine 100). For example, depending on the precise configuration of pivot arms 220, 230 and linear actuators 240, 250, the range of motion of pivot arms 220 and 230 may be bounded by a position whereby pivot arms 220, 230 and the forward/aft surfaces (relative to the paving machine 100) of frame members 204, 206 define an angle of less than 90 degrees. As shown by FIG. 2C, the range of motion of pivot arms 220, 230 may be bounded by a position whereby forward pivot arm 220 and the forward surface of frame member 204 (and, similarly, aft pivot arm 230 and the aft surface of frame member 206) define an angle of between 78 to 82 degrees. In one embodiment, as shown by FIG. 2C, due to the precise positioning of frame members 204, 206 and the flanges 208, 212 connecting the frame members 204, 206 to end frame 202, the range of motion of forward pivot arm 220 is bounded by a position whereby forward pivot arm 220 and the forward surface of frame member 204 define an angle of 78.5 degrees, and the range of motion of aft pivot arm 230 is bounded by a position whereby aft pivot arm 230 and the aft surface of frame member 206 define an angle of 81.5 degrees.

In one embodiment, linear actuators 240, 250 automatically (ex.—without manual repositioning or disconnection of the components of pivot arm positioning assembly 200) reconfigure paving machine 100 from an operating configuration to a transport configuration whereby the overall width of paving machine 100 is minimized and the pivot arms 220, 230 of pivot arm positioning assembly 200 extend parallel to the lateral framework 120 of paving machine 100 and perpendicular to the paving direction 110. In one embodiment, referring to FIGS. 3A and 3B, forward linear actuator 240 extends to articulate forward pivot arm 220 around a continuous arc 260 into a position parallel to frame member 204 and perpendicular to the outer surface of end frame 202. Similarly, in one embodiment aft linear actuator 250 extends to articulate aft pivot arm 230 around a continuous arc 262 into a position parallel to frame member 206 and likewise perpendicular to the outer surface of end frame 202. In one embodiment, paving machine 100 converts to a transport configuration (i.e., the machine 100 may be prepared for transport to a new location) by first bracing the lateral framework 120 or end frame 202 at its current height (or jacking the lateral framework 120 and/or end frames 202 to an increased height). The adjustable legs 170, 172 of paving machine 100 may then lift forward steerable crawlers 160 and aft steerable crawlers 162 above ground level, so that forward pivot arms 220 and aft pivot arms 230 (as well as attached legs 170,172 and steerable crawlers 160, 162) can pivot freely. In one embodiment, linear actuators 240, 250 may then articulate their respective pivot arms 220, 230 through continuous arcs 260, 262 until pivot arms 220, 230 are positioned as shown by FIGS. 3A-3B. For example, linear actuators 240, 250 may include hydraulic cylinders controlled by an operator through a user interface of paving machine 100. The operation of linear actuators 240, 250 may also be pre-programmed into the control system of paving machine 100. In one embodiment, the control system of paving machine 100 articulates pivot arms 220, 230 while steerable crawlers 160, 162 remain in contact with the ground. For example, the control system of paving machine 100 rotates forward steerable crawlers 160 and aft steerable crawlers 162 relative to their respective adjustable legs 170 and 172, so that the alignment of steerable crawlers 160, 162 matches the rotation of pivot arms 220, 230. For example, paving machine 100 can therefore automatically, and with minimal downtime, transition from an operating configuration into a transport configuration without the need to manually reposition, disconnect, or reconnect any component of pivot arm positioning assembly 200. For example, once paving machine 100 is transported to a new site, linear actuators 240, 250 and pivot arms 220, 230 can be activated to similarly reconfigure paving machine 100 for operation by reversing the above procedure.

In one embodiment, each forward linear actuator 240 includes a barrel end (ex.—cylinder case) 242 and a rod end 244. For example, the rod end 244 may be fixed to the forward surface of frame member 204 via trunnion mount 248. In one embodiment, as best shown by FIG. 3B, the barrel end 242 of forward linear actuator 240 is fixed to forward pivot arm 220 by forward bracket 228 and trunnion ring 246. Similarly, as best shown by FIG. 3A, in one embodiment each aft linear actuator 250 includes a barrel end 252 and a rod end 254. For example, rod end 254 may be fixed to the aft surface of frame member 206 via trunnion mount 258. In one embodiment, barrel end 252 may be pivotably fixed to aft pivot arm 230 via trunnion ring 256 and forward bracket 238.

Figure 4A:
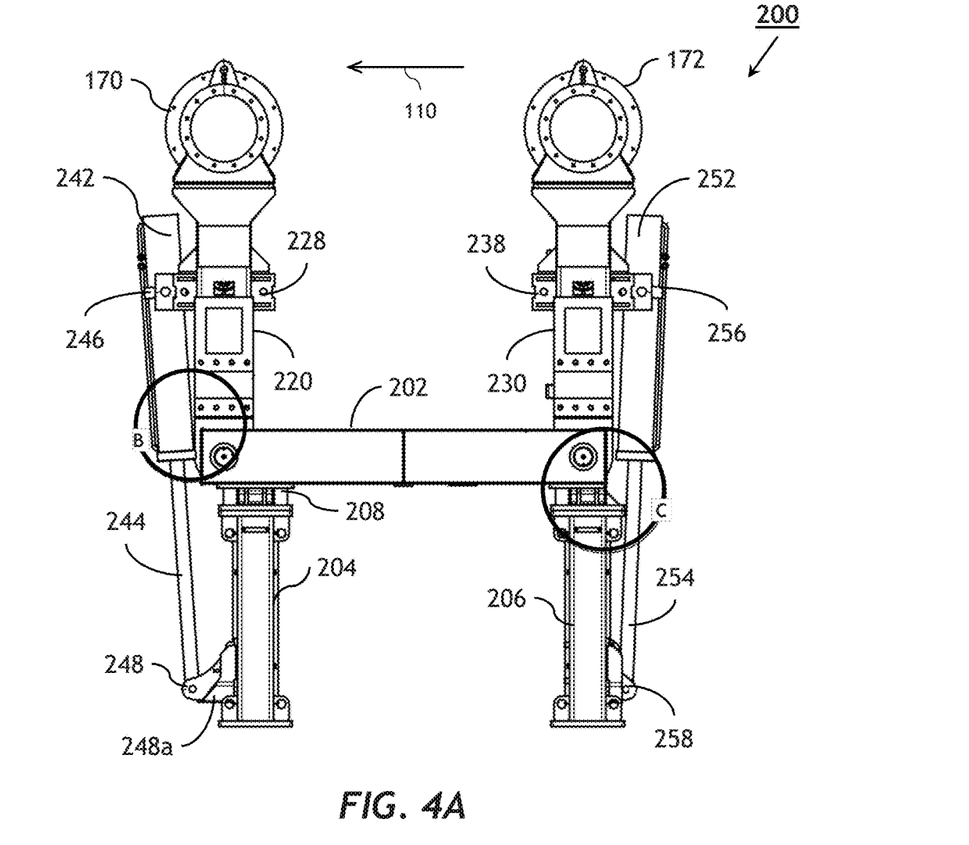
FIG. 4A is an overhead view of a pivot arm assembly in an extended configuration according to an embodiment of the present invention.
Figure 4B:
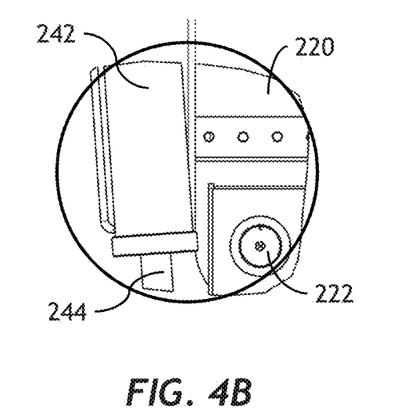
FIGS. 4B and 4C are inset overhead views of a pivot arm assembly in an extended configuration according to an embodiment of the present invention, as illustrated by FIG. 4A.
Figure 4C:
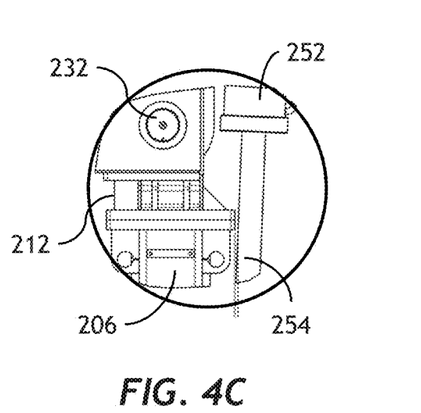

In one embodiment, referring to FIGS. 4A-4C, the precise alignment of frame members 204 and 206, pivot pins 222 and 232, and pivot arms 220 and 230 of pivot arm positioning assembly 200 may vary. For example, frame member 204 may be mounted to end frame 202 (via flange 208) such that the forward surface of frame member 204 lies inside the forward end of end frame 202. However, frame member 206 may be mounted to end frame 202 so that the aft surface of frame member 206 is flush with the aft end of end frame 202. In one embodiment, the trunnion mount 248 of forward rod end 244 may be extended outward (248a) from the forward surface of frame member 204 to allow forward linear actuator 240 to fully articulate forward pivot arm 220 to a position perpendicular to end frame 202 (as shown by FIG. 4A) without contacting end frame 202. In one embodiment, referring to FIG. 4B, a trunnion mount extension 248a extends forward trunnion mount 248 from the forward surface of frame member 204 (compare to aft trunnion mount 258 and frame member 206) so that forward linear actuator 240 fully articulates forward pivot arm 220 between the position shown in FIG. 2C and the position shown in FIG. 4A, while preventing forward barrel end 240a from contacting or impacting forward pivot arm 220. In one embodiment, referring to FIG. 4C, the flange 212 connecting frame member 206 to end frame 202 is truncated so that aft linear actuator 250 fully articulates aft pivot arm 230 between the position shown in FIG. 2C and the position shown in FIG. 4A while preventing barrel end 252 or rod end 254 from contacting or impacting flange 212, frame member 206, or pivot arm 230.

Figure 5A:
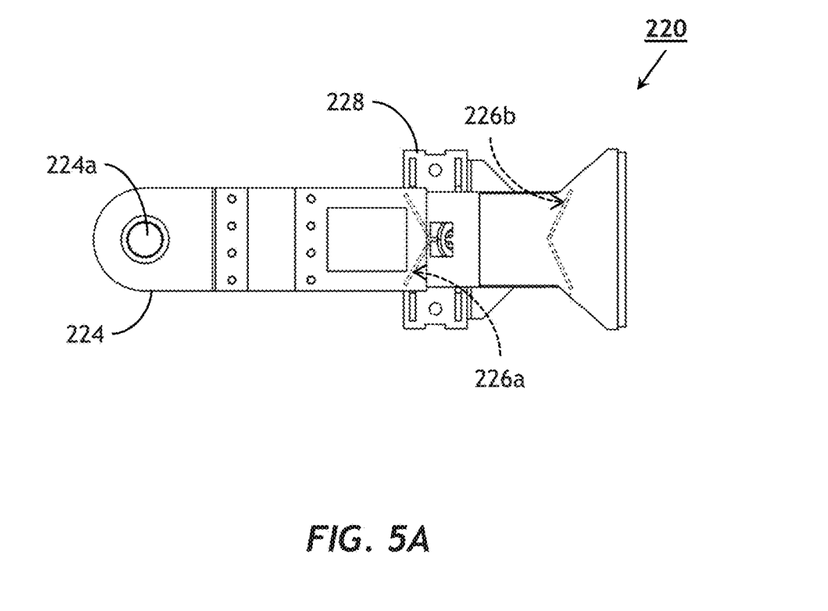
FIG. 5A is an overhead view, and FIG. 5B a side view, of a pivot arm according to an embodiment of the present invention.
Figure 5B:
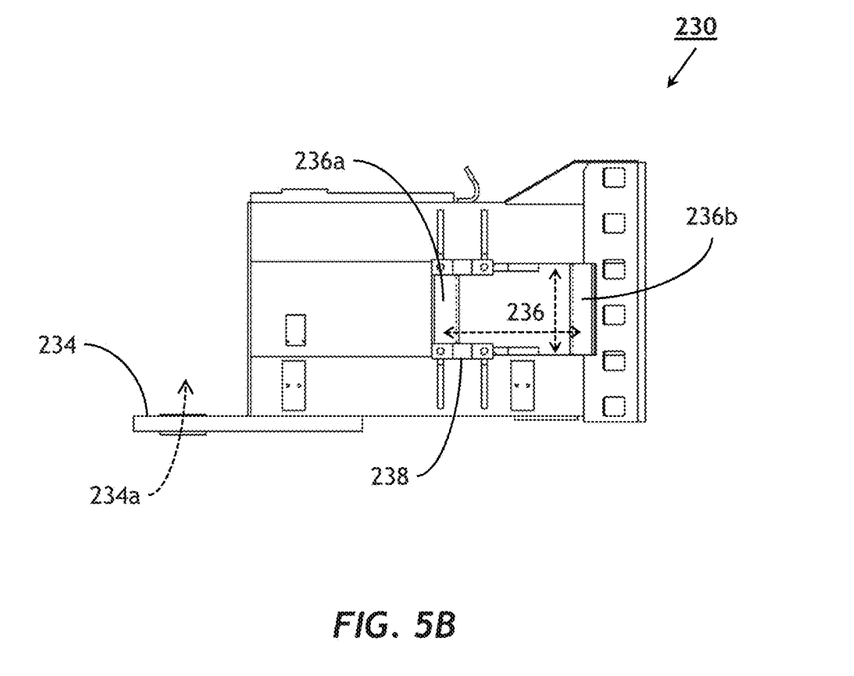

In one embodiment, referring to FIGS. 5A and 5B, pivot arms 220 and 230 of pivot arm positioning assembly 200 incorporate an opening 226, 236 to accommodate the barrel end 242, 252 of linear actuator 240, 250 when pivot arm positioning assembly 200 is positioned as in FIGS. 2A-2D. For example, referring to FIG. 5A, forward pivot arm 220 may include a yoke 224 incorporating a center hole 224a configured to fit the forward pivot pin 222. The opening 226 through pivot arm 220 may include interior walls 226a, 226b that define the size of the opening 226. In one embodiment, forward bracket 228 is configured to fit trunnion ring 242 (not shown) of forward linear actuator 240 (not shown). In one embodiment, referring to FIG. 5B, pivot arm 230 is identical to pivot arm 220, and an opening 236 extends fully through aft pivot arm 230, bounded by interior walls 236a, 236b. For example, the barrel end 252 of aft linear actuator 250 (not shown, but pivotably secured to aft pivot arm 230 by aft bracket 238) may extend partially through opening 236 when pivot arm positioning assembly 200 is positioned as in FIG. 2C.

Figure 6:
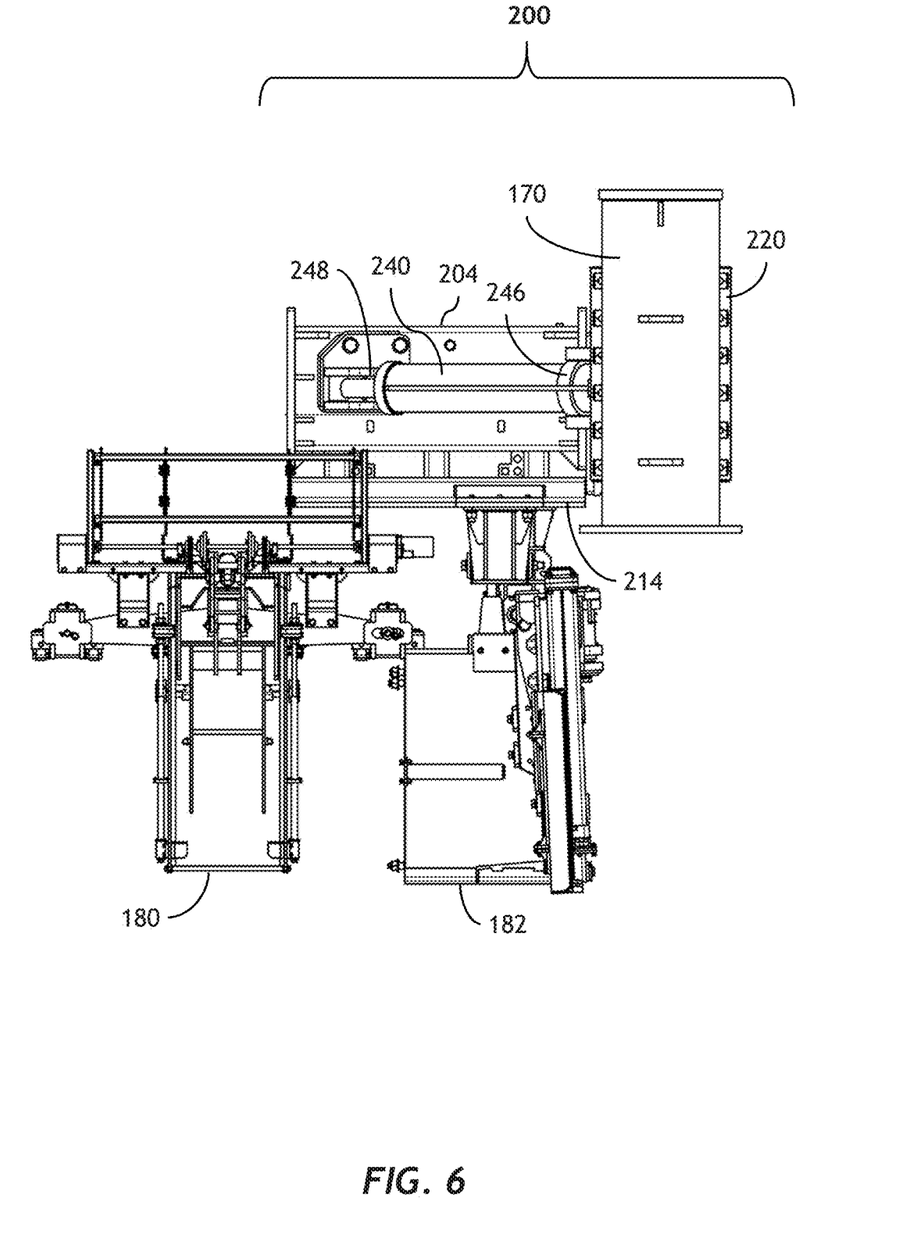
FIG. 6 is a front view of a pivot arm assembly according to an embodiment of the present invention, including accessories attached to the paving machine.
Figure 7A:
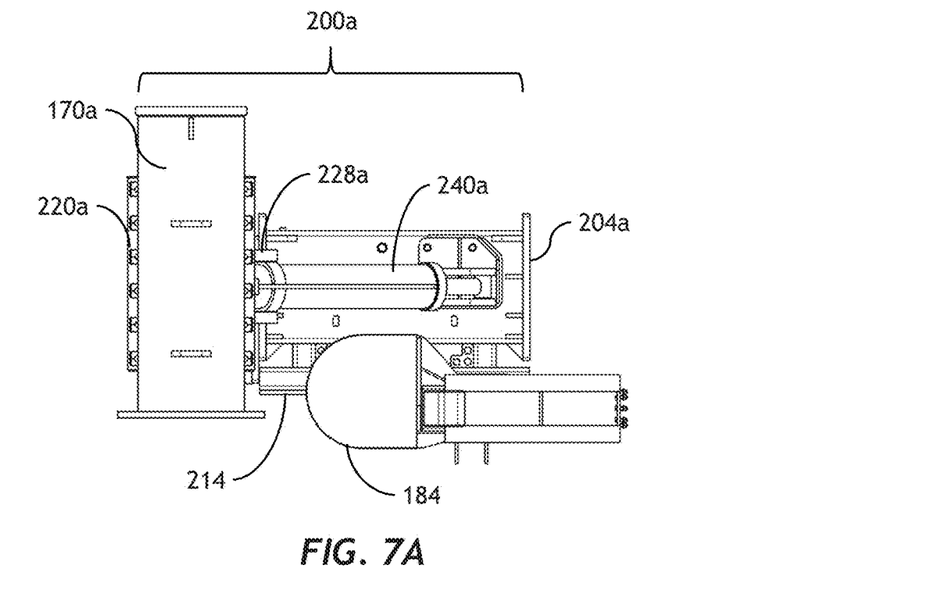
FIGS. 7A and 7B are front views of a pivot arm assembly according to an embodiment of the present invention, including accessories attached to the paving machine.
Figure 7B:
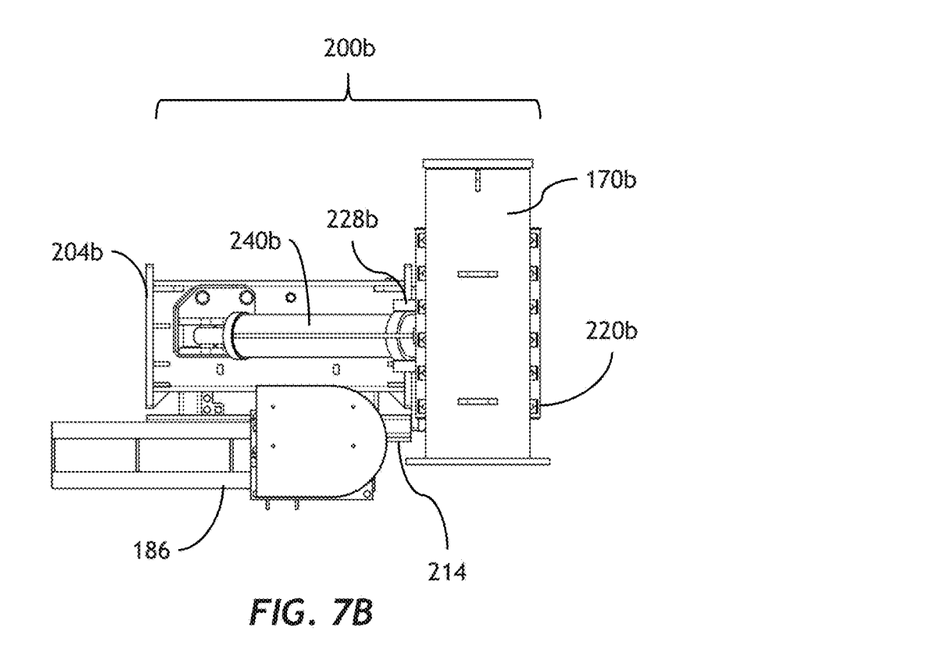

In one embodiment, referring to FIG. 6, pivot arm positioning assembly 200 may be configured to allow additional accessories to be mounted to the lateral framework of paving machine 100 without removing adjustable legs 170, 172 or steerable crawlers 160, 162. For example, a dowel bar inserter (DBI) 180 and paving form 182 or other accessory (or combination of accessories) may be removably mounted to the T-rail system 214 of frame member 204. However, the positioning of DBI 180 and paving form 182 do not impede pivot arm positioning assembly 200 from articulating adjustable leg 170 through its full range of motion. In one embodiment, referring to FIGS. 7A and 7B, a spreader plow assembly including drum cover 184 and sheave cover 186 may be removably mounted to the forward surface of lateral framework 120 (via T-rail 214 of forward frame members 204a, 204b) without impeding the operation of pivot arm positioning assemblies 200a and 200b.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

We claim:

1. An apparatus for automatically changing the configuration of a paving machine configured to operate in a paving direction parallel to the longitudinal axis of the machine, the paving machine having a first end, a second end, and a framework laterally connecting the first end and the second end, the framework having a forward surface, an aft surface, and at least one power source fixed thereto, the apparatus comprising:
   at least one end frame couplable to either the first end or the second end, the at least one end frame having a forward end, an aft end, and an outer surface parallel to the longitudinal axis;
   at least one pivot arm rotatably coupled to the at least one end frame by at least one pivot pin, the at least one pivot arm including at least a forward pivot arm rotatably coupled to the forward end by a forward pivot pin and an aft pivot arm rotatably coupled to the aft end by an aft pivot pin; and
   at least one linear actuator operably coupled to the at least one power source and having at least a barrel end and a rod end, the at least one linear actuator configured to articulate the at least one pivot arm, the at least one linear actuator including at least
   (1) a forward linear actuator having a forward barrel end pivotably coupled to the forward pivot arm and a forward rod end fixed to the forward surface, the forward linear actuator configured to articulate the forward pivot arm through a first continuous arc of at least 90 degrees around a first rotational axis defined by the forward pivot pin, and
   (2) an aft linear actuator having an aft barrel end pivotably coupled to the aft pivot arm and an aft rod end fixed to the aft surface, the aft linear actuator configured to articulate the aft pivot arm through a second continuous arc of at least 90 degrees around a second rotational axis defined by the aft pivot pin.

2. The apparatus of claim 1, wherein:
   the first continuous arc is bounded by (a) a first pivot arm position wherein the forward pivot arm and the forward surface define an angle of less than 90 degrees and (b) a second pivot arm position wherein the forward pivot arm is parallel to the forward surface and perpendicular to the outer surface; and
   the second continuous arc is bounded by (a) a third pivot arm position wherein the aft pivot arm and the aft surface define an angle of less than 90 degrees and (b) a fourth pivot arm position wherein the aft pivot arm is parallel to the aft surface and perpendicular to the outer surface.

3. The apparatus of claim 1, wherein the at least one pivot arm includes an opening configured to accommodate the barrel end of the at least one linear actuator.

4. The apparatus of claim 1, wherein the at least one linear actuator includes at least one hydraulic cylinder.

5. The apparatus of claim 1, wherein the at least one power source includes at least one of a gasoline engine, a diesel engine, and an electric battery.

6. The apparatus of claim 1, wherein the paving machine is selected from a group comprising a slipform paving machine, a concrete paving machine, a texturing machine, a spreader machine, a placer machine, and a curing machine.

7. A paving machine configured to operate in a paving direction parallel to the longitudinal axis of the paving machine, and having a left end and a right end, the paving machine comprising:
   a framework laterally connecting the left end and the right end, the framework having at least a forward surface and an aft surface;
   at least one power source fixed to the framework;
   a left end frame removably fixed to the framework at the left end and a right end frame removably fixed to the framework at the right end, each end frame having at least a forward end, an aft end, and an outer surface parallel to the longitudinal axis;
   at least a forward pivot arm and an aft pivot arm rotatably coupled to each end frame, the forward pivot arm rotatably coupled to each forward end by a forward pivot pin and the aft pivot pin rotatably coupled to each aft end by an aft pivot pin;
   a plurality of linear actuators, including at least one forward linear actuator and at least one aft linear actuator;
   the at least one forward linear actuator operably coupled to the at least one power source and configured to articulate each forward pivot arm through a first continuous arc of at least 90 degrees around a first rotational axis defined by the forward pivot pin, the at least one forward linear actuator having a forward rod end fixed to the forward surface and a forward barrel end pivotably coupled to the forward pivot arm;

the at least one aft linear actuator operably coupled to the at least one power source and configured to articulate each aft pivot arm through a second continuous arc of at least 90 degrees around a second rotational axis defined by the aft pivot pin, the at least one aft linear actuator having an aft rod end fixed to the aft surface and an aft barrel end pivotably coupled to the aft pivot arm;

a forward leg coupled to each forward pivot arm opposite the forward pivot pin;

a forward steerable crawler rotatably coupled to each forward leg;

an aft leg coupled to each aft pivot arm opposite the aft pivot pin; and an aft steerable crawler rotatably coupled to each aft leg.

8. The paving machine of claim 7, further comprising at least one accessory fixed to the framework.

9. The paving machine of claim 8, wherein the at least one accessory includes at least one of a spreader plow and a dowel bar inserter.

10. The paving machine of claim 7, wherein the at least one forward linear actuator is configured to articulate each forward pivot arm through a first continuous arc bounded by (a) a first pivot arm position wherein each forward pivot arm and the forward surface define an angle of less than 90 degrees and (b) a second pivot arm position wherein each forward pivot arm is parallel to the forward surface and perpendicular to the outer surface; and through a second continuous arc is bounded by (a) a third pivot arm position wherein the aft pivot arm and the aft surface define an angle of less than 90 degrees and (b) a fourth pivot arm position wherein the aft pivot arm is parallel to the aft surface and perpendicular to the outer surface.

11. The paving machine of claim 7, wherein the at least one forward linear actuator and the at least one aft linear actuator include at least one hydraulic cylinder.

12. The paving machine of claim 7, wherein:

at least one forward pivot arm includes an opening configured to accommodate the barrel end of the at least one forward linear actuator;

at least one aft pivot arm includes an opening configured to accommodate the barrel end of the at least one aft linear actuator.

13. The paving machine of claim 7, further comprising:

a control system fixed to the framework and operably coupled to the at least one forward linear actuator and to the at least one aft linear actuator, the control system configured to control the articulation of the at least one forward linear actuator and the at least one aft linear actuator based on user input.

14. The paving machine of claim 7, wherein the at least one power source includes at least one of a gasoline engine, a diesel engine, and an electric battery.

15. The paving machine of claim 7, wherein the paving machine includes at least one of a slipform paving machine, a concrete paving machine, a texturing machine, a spreader machine, a placer machine, and a curing machine.

* * * * *